United States Patent
Steele et al.

(10) Patent No.: US 9,222,040 B2
(45) Date of Patent: Dec. 29, 2015

(54) SYSTEM AND METHOD FOR SLURRY HANDLING

(75) Inventors: Raymond Douglas Steele, Cypress, TX (US); Judith Pauline Oppenheim, Friendswood, TX (US)

(73) Assignee: General Electric Company, Schenectady, NY (US)

( * ) Notice: Subject to any disclaimer, the term of this patent is extended or adjusted under 35 U.S.C. 154(b) by 560 days.

(21) Appl. No.: 13/491,463

(22) Filed: Jun. 7, 2012

(65) Prior Publication Data

US 2013/0327028 A1    Dec. 12, 2013

(51) Int. Cl.
| | |
|---|---|
| *B01J 7/00* | (2006.01) |
| *C01B 3/36* | (2006.01) |
| *C10J 3/52* | (2006.01) |
| *C10J 3/72* | (2006.01) |
| *C10J 3/84* | (2006.01) |

(52) U.S. Cl.
CPC *C10J 3/526* (2013.01); *C10J 3/723* (2013.01); *C10J 3/845* (2013.01); *C10J 2300/093* (2013.01); *C10J 2300/0959* (2013.01); *C10J 2300/169* (2013.01); *C10J 2300/1846* (2013.01); *Y02E 20/16* (2013.01); *Y02E 20/18* (2013.01)

(58) Field of Classification Search
None
See application file for complete search history.

(56) References Cited

U.S. PATENT DOCUMENTS

| | | | |
|---|---|---|---|
| 3,841,465 A | 10/1974 | Miller et al. | |
| 3,882,946 A | 5/1975 | Ioannesian et al. | |
| 3,944,380 A | 3/1976 | Kampe | |
| 3,992,784 A * | 11/1976 | Verschuur et al. | 34/385 |
| 4,017,270 A * | 4/1977 | Funk et al. | 48/197 R |
| 4,106,533 A | 8/1978 | Herzig | |
| 4,204,955 A | 5/1980 | Armstrong | |
| 4,236,868 A | 12/1980 | Linhardt | |
| 4,292,991 A | 10/1981 | Wing | |
| 4,313,737 A * | 2/1982 | Massey et al. | 241/1 |
| 4,377,392 A * | 3/1983 | Massey et al. | 44/281 |
| 4,472,171 A | 9/1984 | Broderick | |
| 4,666,464 A * | 5/1987 | Najjar et al. | 48/197 R |
| 4,668,130 A | 5/1987 | Sharp | |
| 4,765,781 A * | 8/1988 | Wilks et al. | 406/197 |
| 4,828,581 A | 5/1989 | Feldmann et al. | |
| 4,907,565 A * | 3/1990 | Bailey et al. | 123/23 |
| 5,050,375 A * | 9/1991 | Dickinson | 60/39.12 |
| 5,051,041 A | 9/1991 | Firth | |
| 5,102,237 A | 4/1992 | Ide | |

(Continued)

FOREIGN PATENT DOCUMENTS

| | | |
|---|---|---|
| EP | 0256186 A1 | 2/1988 |
| EP | 0343620 A2 | 11/1989 |

(Continued)

OTHER PUBLICATIONS

U.S. Appl. No. 14/103,714, filed Dec. 11, 2013, Hsien-Chin William Yen, Unpublished.

(Continued)

*Primary Examiner* — Imran Akram
(74) *Attorney, Agent, or Firm* — Fletcher Yoder P.C.

(57) ABSTRACT

A system includes a slurry depressurizing system that includes a liquid expansion system configured to continuously receive a slurry at a first pressure and continuously discharge the slurry at a second pressure. For example, the slurry depressurizing system may include an expansion turbine to expand the slurry from the first pressure to the second pressure.

24 Claims, 2 Drawing Sheets

(56) References Cited

U.S. PATENT DOCUMENTS

| | | | |
|---|---|---|---|
| 5,188,741 A * | 2/1993 | Zang et al. | 210/774 |
| 5,223,144 A | 6/1993 | Woyciesjes et al. | |
| 5,223,199 A | 6/1993 | Ponzielli | |
| 5,356,280 A | 10/1994 | Ponzielli | |
| 5,381,886 A | 1/1995 | Hay | |
| 5,402,876 A | 4/1995 | Hay | |
| 5,459,674 A | 10/1995 | Ide et al. | |
| 5,657,704 A | 8/1997 | Schueler | |
| 5,685,153 A * | 11/1997 | Dickinson et al. | 60/648 |
| 5,753,075 A | 5/1998 | Stromberg et al. | |
| 5,797,332 A | 8/1998 | Keller et al. | |
| 6,141,796 A * | 11/2000 | Cummings | 60/39.12 |
| 6,640,696 B2 | 11/2003 | Shinobudani et al. | |
| 6,706,199 B2 | 3/2004 | Winter et al. | |
| 7,374,734 B2 | 5/2008 | Grossman et al. | |
| 7,562,777 B1 * | 7/2009 | Seenivasan | 209/170 |
| 7,731,783 B2 | 6/2010 | Sprouse et al. | |
| 8,434,641 B2 | 5/2013 | Coughlin et al. | |
| 2001/0032780 A1 | 10/2001 | Winter et al. | |
| 2004/0107700 A1 * | 6/2004 | McClanahan et al. | 60/670 |
| 2005/0177013 A1 * | 8/2005 | Countz | 585/240 |
| 2006/0096163 A1 * | 5/2006 | Dickinson et al. | 44/552 |
| 2008/0145156 A1 | 6/2008 | Livingood et al. | |
| 2009/0107046 A1 | 4/2009 | Leininger et al. | |
| 2009/0178338 A1 | 7/2009 | Leininger et al. | |
| 2009/0217666 A1 * | 9/2009 | Farkaly | 60/670 |
| 2010/0242354 A1 | 9/2010 | Perkins et al. | |
| 2011/0072723 A1 | 3/2011 | Liu et al. | |
| 2011/0091953 A1 * | 4/2011 | Bolin et al. | 435/167 |
| 2011/0251440 A1 | 10/2011 | Huegle et al. | |
| 2012/0067047 A1 | 3/2012 | Peterson et al. | |
| 2012/0198768 A1 * | 8/2012 | Khosravian et al. | 48/61 |
| 2012/0282467 A1 * | 11/2012 | Iyer et al. | 428/402 |
| 2013/0019530 A1 * | 1/2013 | Favilli et al. | 48/127.5 |
| 2013/0126002 A1 | 5/2013 | Bathurst | |
| 2014/0150288 A1 | 6/2014 | Leininger et al. | |
| 2014/0150873 A1 | 6/2014 | Stevenson et al. | |
| 2014/0151191 A1 | 6/2014 | Stevenson et al. | |

FOREIGN PATENT DOCUMENTS

| | | |
|---|---|---|
| EP | 0418442 A1 | 3/1991 |
| EP | 0646746 A2 | 4/1995 |
| FR | 2811380 A1 | 1/2002 |
| FR | 2811380 B1 | 10/2002 |
| GB | 1457839 | 12/1976 |
| RU | 2376493 C2 | 12/2009 |
| RU | 2421612 C1 | 6/2011 |
| WO | 9825027 A1 | 6/1998 |
| WO | 9943954 A1 | 9/1999 |
| WO | 0053924 A1 | 9/2000 |
| WO | 0202935 A1 | 1/2002 |
| WO | 03067082 A1 | 8/2003 |
| WO | WO 2011121423 A2 * | 10/2011 |

OTHER PUBLICATIONS

Perry, Robert H., Process Machinery Drives Expansion Turbines, Perry's Chemical Engineers' Handbook, Sixth Edition, 1984, pp. 24-32 Thru 24-37.

* cited by examiner

SYSTEM AND METHOD FOR SLURRY HANDLING

STATEMENT REGARDING FEDERALLY SPONSORED RESEARCH & DEVELOPMENT

This invention was made with Government support under contract number DE-FE0007859 awarded by the Department of Energy. The Government has certain rights in the invention.

BACKGROUND OF THE INVENTION

The subject matter disclosed herein relates to slurry systems, and, more particularly, to a continuous slurry handling system.

Slurries are fluid mixtures of solid particles suspended in a liquid and are used in various industrial processes. For example, partial oxidation systems may partially oxidize carbon-containing compounds in an oxygen-containing environment to generate various products and by-products. For example, gasifiers at an integrated gasification combined cycle (IGCC) power plant may convert carbonaceous materials into a useful mixture of carbon monoxide and hydrogen, referred to as synthesis gas or syngas. In the case of an ash-containing carbonaceous material, the resulting syngas may also include less desirable components, such as heavy ash or molten slag, which may be removed from the gasifier along with the useful syngas produced. Accordingly, the molten slag byproduct produced in the gasifier reactions may be directed into a gasifier quench liquid in order to solidify the molten slag and to create a slurry. Generally, this slurry is discharged from the gasifier at elevated temperatures and high pressures. The pressure of the slurry being discharged from the gasifier is reduced to enable the disposal of, or the further processing of, the slurry.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a slurry depressurizing system that includes a liquid expansion system configured to continuously receive a slurry at a first pressure and continuously discharge the slurry at a second pressure.

In a second embodiment, a system includes a gasifier configured to generate a slag. The slag includes a suspension of gasification solids in a quench liquid. The system also includes a centrifugal pump configured to operate in a reverse flow mode, to continuously receive the slag from the gasifier at the first pressure, and to continuously discharge the slag at a second pressure. The first pressure is greater than the second pressure.

In a third embodiment, a method includes receiving a continuous slag flow at a first pressure at a liquid expansion system. The continuous slag flow includes a suspension of gasification solids in a quench liquid. The method also includes feeding the continuous slag flow through the liquid expansion system, and discharging the continuous slag flow from the liquid expansion system at a second pressure. The first pressure is greater than the second pressure.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
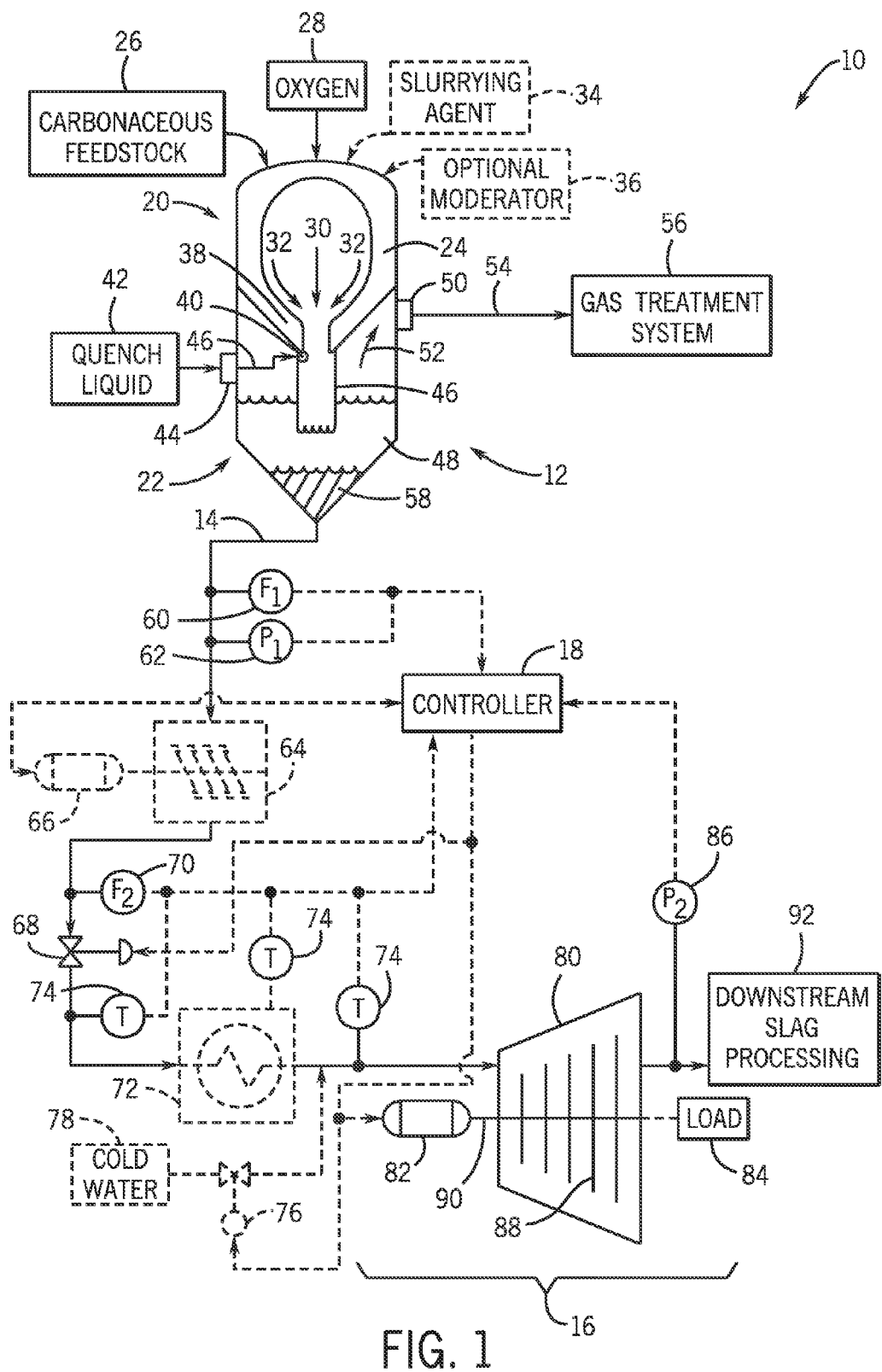
FIG. 1 is a schematic diagram of an embodiment of a continuous slag removal system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Various industrial processes involve the handling of slurries. In certain situations, the slurry is transported from a first location, or vessel, to a second location. In some situations, the slurry may also undergo depressurization during transport. In other words, the pressure of the slurry may be reduced as it is transported from the first location to the second location. For example, the reaction chamber of a partial oxidation system (e.g., a gasifier) may receive a carbonaceous feedstock (e.g., a slurry of particulate solids, a pneumatically-conveyed stream of particulate solids, a liquid, a gas, or any combination thereof), an oxidant, such as high purity oxygen, and in some cases, additional water. The partial oxidation of the feedstock, the oxidant, and in some cases, the additional water, may produce a useful gaseous product and may also produce an ash or a molten slag byproduct. For example, a gasifier may receive the feedstock, the oxygen and perhaps some water to generate a synthetic gas, or syngas, and a molten slag. In certain cases, the molten slag may flow through the gasifier into a quenching liquid, such as water, to create a slurry. The slurry being discharged from the gasifier may be at a gage pressure between approximately 1000 to 10,000 kilopascals (kPa). Before the slurry is further processed or disposed of, it may be necessary to decrease the pressure (i.e., depressurize) of the slurry, such as an atmospheric pressure. The disclosed embodiments remove the slurry in a continuous process, rather than a batch process. Although a lock hopper system can effectively remove the slurry, it operates cyclically in a batch mode, occupies a large amount of vertical space, and includes expensive valves. Furthermore, the lock hopper system may use additional amounts of water, which must be removed during supplementary slurry processing. Thus, the disclosed embodiments employ a liquid expansion system to continuously remove the slurry and reduce the pressure, while also consuming less space and possibly generating power. Therefore, certain embodiments may be referred to as slurry depressurizing systems, or more generally as slurry handling systems.

For example, the disclosed embodiments include a slurry depressurizing system that uses a liquid expansion system to continuously reduce the pressure of the slurry. The slurry may undergo an approximately isentropic expansion in the liquid expansion system. In certain embodiments, the slurry depressurizing system is used for continuous slag removal from partial oxidation systems, and the liquid expansion system includes turbomachinery or, more generally, any expansion machinery, such as, but not limited to, an expansion turbine, a modified centrifugal pump, a reciprocating device, a non-rotating device, a piston, a diaphragm, and so forth, to reduce the initial pressure of the slag slurry to a lower pressure, such as an atmospheric pressure. In addition to reducing the initial pressure of the slag slurry, the energy provided by the slurry flowing through the liquid expansion system may be dissipated using a friction brake. Additionally or alternatively, the liquid expansion system may also utilize the pressure drop to produce mechanical or electrical power. For example, the expansion turbine coupled to a generator may rotate in response to a flow of the slag slurry through the expansion turbine, and the generator may then produce electrical power in response to the rotation. As a further example, the modified centrifugal pump coupled to a generator may operate to produce electrical power in response to the flow of slurry through the modified centrifugal pump.

With the foregoing in mind, FIG. 1 is a schematic diagram of an embodiment of a continuous slag removal system 10. As shown in FIG. 1, the continuous slag removal system 10 may include a partial oxidation system, such as a gasifier 12, a slag slurry 14, a liquid expansion system 16 (e.g., an expansion turbine, a centrifugal pump, or a reciprocating device), and a controller 18.

The partial oxidation system, or gasifier 12, may further include a reaction chamber 20, and a quench chamber 22. A protective barrier 24 may enclose the reaction chamber 20, and may act as a physical barrier, a thermal barrier, a chemical barrier, or any combination thereof. Examples of materials that may be used for the protective barrier 24 include, but are not limited to, refractory materials, non-metallic materials, ceramics, and oxides of chromium, aluminum, silicon, magnesium, iron, titanium, zirconium, and calcium. In addition, the materials used for the protective barrier 24 may be in the form of bricks, castable refractory, coatings, or any combination thereof. In general, the reaction chamber 20 may provide a controlled environment for the partial oxidation chemical reaction to take place. A partial oxidation chemical reaction can occur when a fuel or a hydrocarbon is mixed in an exothermic process with oxygen to produce a gaseous product and byproducts. For example, a carbonaceous feedstock 26 may be introduced to the reaction chamber 20 with oxygen 28 to produce an untreated syngas 30 and a molten slag 32. The carbonaceous feedstock 26 may include materials such as biofuels or fossil fuels, and may be in the form of a solid, a liquid, a gas, a slurry, or any combination thereof. The oxygen 28 introduced to the reaction chamber 20 may be replaced with air, or oxygen-enriched air. In certain embodiments, an optional slag slurrying agent 34 may also be added to the reaction chamber 20. The slag slurrying agent 34 may be used to maintain the viscosity of the slag slurry 14 within a suitable range and thus may aid in transporting the slag slurry 14 through the continuous slag removal system 10. In yet other embodiments, an optional moderator 36, such as water or steam, may also be introduced into the reaction chamber 20. The chemical reaction within the reaction chamber 20 may be accomplished by subjecting the carbonaceous feedstock 26 to steam and oxygen at elevated gage pressures, e.g., from approximately 2000 to 10,000 kPa, or 3000 to 8500 kPa, and temperatures, e.g., approximately 1100 degrees C. to 1500 degrees C., depending on the type of gasifier 12 utilized. Under these conditions, and depending upon the composition of the ash in the carbonaceous feedstock 26, the ash may be in the molten state, which is referred to as molten ash, or molten slag 32.

The quench chamber 22 of the partial oxidation system, or gasifier 12, may receive the untreated syngas 30 and the molten slag 32 as it leaves the reaction chamber 20 through the bottom end 38 (or throat) of the protective barrier 24. The untreated syngas 30 and the molten slag 32 enter the quench chamber 22 at a high pressure and a high temperature. In general, the quench chamber 22 may be used to reduce the temperature of the untreated syngas 30 to disengage the molten slag 32 from the untreated syngas 30, and to quench the molten slag 32. In certain embodiments, a quench ring 40, located at the bottom end 38 of the protective barrier 24, is configured to provide a quench liquid 42, such as water, to the quench chamber 22. The quench liquid may be received by a quench inlet 44 and into the quench ring 40 through a line 46. In general, the quench liquid 42 may flow through the quench ring 40 and down the inner surface of a dip tube 46 into a quench chamber sump 48. Likewise, the untreated syngas 30 and the molten slag 32 may also flow through the bottom end 38 of the protective barrier 24, and along the inner surface of the dip tube 46 into the quench chamber sump 48. As the untreated syngas 30 passes through the pool of quench liquid 42 in the quench chamber sump 48, the molten slag 32 is solidified and disengaged from the syngas, the syngas is cooled and quenched, and the syngas subsequently exits the quench chamber 22 through a syngas outlet 50, as illustrated by arrow 52. Syngas 54 exits through the syngas outlet 50 for further processing in a gas treatment system 56, where it may be further processed to remove acid gases, particulates, etc., to form a treated syngas. Solidified slag 58 may accumulate at the bottom of the quench chamber sump 48 and may be continuously removed from the gasifier 12 as the slag slurry 14. In certain embodiments, a portion of the quench liquid 42 may also be continuously removed from the quench chamber sump 48 for treatment. For example, particulates, soot, slag, and other matter may be removed from the quench liquid 42 in a black water treatment system and the treated quench liquid 42 returned to the quench chamber sump 48 through the quench inlet 44. In such embodiments, the removed quench liquid 42 may have properties similar to the slag slurry 14 and thus, may be transported and depressurized using a liquid expansion system separate from or shared with the liquid expansion system 16 for the slag slurry 14.

The slag slurry 14 may have various compositions of solids suspended in the quench liquid, including, but not limited to, fuels (e.g. coals), dry char, catalysts, plastics, chemicals, minerals, and/or other products. The slag slurry 14 being discharged from the gasifier 12 may have a high pressure and a high temperature. For example, the gage pressure of the slag slurry 14 may be between approximately 1000 to 10,000 kPa, 2000 to 9000 kPa, or 3000 to 8000 kPa and the temperature of the slag slurry may be between approximately 150 to 350 degrees C., 200 to 300 degrees C., or 225 to 275 degrees C. In certain embodiments, the controller 18 may receive signals from various sensors disposed throughout the continuous slag removal system 10. For example, sensors may provide information regarding characteristics of the slag slurry 14, operating conditions within the continuous slag removal system 10, the flow rate of the slag slurry 14, temperatures of the slag slurry 14, pressures of the slag slurry 14 at various sites, and so forth. In one embodiment, a flow sensor "F1" 60 may provide information regarding the flow rate of the slag slurry 14 exiting from the gasifier 12. In another embodiment, a first pressure sensor "P1" 62 may provide information on the first pressure of the slag slurry 14 exiting from the gasifier 12. In further embodiments, the controller 18 may receive additional sensor information about the slag slurry 14 as it exits the gasifier 12, such as, but not limited to, viscosity, temperature, particle size, and so forth. Furthermore, the controller 18 may adjust operational conditions of the continuous slag removal system 10 in response to received sensor information, as described in detail below.

In certain embodiments, one or more slag crushers 64 coupled to a slag crusher driver 66 (e.g., a steam turbine, the liquid expansion system 16, a motor, or other source of power) may optionally receive the slag slurry 14 before it is fed through the liquid expansion system 16. The slag crusher 64 may crush the slag slurry 14 in order to attain a desired particle size distribution or a desired average particle size of particles in the slag slurry 14. The slag crusher 64 may include one or more stages. Establishing an appropriate particle size distribution may be useful for enabling the slag slurry 14 to flow, and for the operation of the liquid expansion system 16. Furthermore, the slag crusher 64 may reduce the average particle size of the solids suspended in the quench liquid of the slag slurry 14 to an appropriate range. In certain embodiments, the slag crusher 64 may reduce the particle size such that the average particle size is between approximately 0.5 to 10 mm, 2 to 8 mm, or 4 to 6 mm. In one embodiment, the average particle size may be less than 6 mm. In certain embodiments, a single slag crusher 64 may be sufficient to establish this average particle size, and in other embodiments, two or more slag crushers 64 may function together (e.g., in series) to establish this average particle size. For example, a first slag crusher may provide a coarse crushing of the slag slurry 14 while a second slag crusher may provide a finer crushing of the slag slurry 64. In one embodiment, the controller 18 may initiate the slag crusher 64 by controlling the slag crusher motor 66. The controller 18 may also adjust the slag crusher motor 66 based on information received from other sensors. In certain embodiments, a flow control valve 68 may be disposed downstream of the slag crusher 64 to adjust the flow rate of the slag slurry 14 flowing to the liquid expansion system 16. In one embodiment, the controller 18 may receive information about the flow rate of the slag slurry 14 from a flow sensor "F2" 70. In response to the information received by the flow sensor "F2" 70, the controller 18 may control the flow rate of the slag slurry 14 by adjusting the flow control valve 68. In other embodiments, the controller 18 may adjust the flow rate of the slag slurry 14 based on signals from other sensors.

In yet other embodiments, an optional heat exchanger (e.g., cooler) 72 may reduce the temperature of the slag slurry 14 before the slag slurry 14 is fed through the liquid expansion system 16 to reduce or prevent flashing (i.e., vaporization) of the slag slurry 14 as it moves through the liquid expansion system 16. The heat exchanger 72 may allow for cooling of the slag slurry 14 without using additional quench liquid 42, such as water, which may involve additional processing (e.g., dewatering) of the slag slurry 14 to remove. Cooling the slag slurry 14 without the use of additional water may simplify downstream processing of the slag slurry 14, e.g., by reducing the amount of water to be removed before disposal of the slag slurry 14. Furthermore, as the slag slurry 14 moves through the heat exchanger 72, the pressure of the slag slurry 14 may drop, simplifying final processing and/or disposal of the slag slurry 14. In one embodiment, the controller 18 may receive information about the temperature of the slag slurry 14 from the temperature sensors "T" 74, which are located at various sites of the slag removal system 10. For example, the temperature sensors "T" 74 may be located before the slag slurry 14 enters the heat exchanger 72, coupled to the heat exchanger 72, or located after the slag slurry 14 leaves the heat exchanger 72. In response to the information received by the temperature sensors "T" 74, the controller 18 may control the cooling provided by the heat exchanger 72. For example, the controller 18 may adjust a control valve that controls the flow rate of a coolant through the heat exchanger 72. In other embodiments, in response to the information received by the temperature sensors "T" 74, the controller 18 may adjust a flow control valve 76 to add additional cold water 78 directly to the slag slurry 14. The additional cold water 78 may further cool the slag slurry 14 before the slag slurry 14 is fed into the liquid expansion system 16. The additional cold water 78 may be removed in the additional processing of the slag slurry 14. In certain embodiments, the addition of the cold water 78 may be omitted. In certain embodiments, the temperature of the slag slurry 14 downstream of the heat exchanger or the addition of the cold water 78 may be between approximately 10 to 150 degrees C., 20 to 125 degrees C., or 30 to 100 degrees C.

In certain embodiments, the slag slurry 14 may be fed into the liquid expansion system 16. Although the following discussion describes the liquid expansion system 16 as a turbomachine, in other embodiments, the liquid expansion system 16 may include any expansion machinery, such as, but not limited to, an expansion turbine, a modified centrifugal pump, a reciprocating device, and so forth. As shown in FIG. 1, the liquid expansion system 16 may include an expansion turbine 80, a turbine motor 82 (or more generally, any driver, such as a steam turbine or other source of power), and a load 84. The expansion turbine 80 may include rotating blades 88 (e.g., buckets, vanes, or similar devices) that causes the rotation of a turbine shaft 90 (i.e., rotating element) in response to a flow of the slag slurry 14 through the expansion turbine 80. The turbine shaft 90 may be coupled to several other components of the liquid expansion system 16, such as the turbine motor 82, and the load 84. The turbine motor 82 is optional and is omitted in certain embodiments. In certain embodiments, the expansion turbine 80 may be supplied with power, such as from the turbine motor 82, during startup, shutdown, low flow conditions, or any other conditions when the power generation curve is negative. For example, during these conditions, the velocity of the slag slurry 14 through the expansion turbine 80 may be insufficient to overcome internal friction. When included, the turbine motor 82 may be controlled by the controller 18 and used to control the rotation of the blades 88 before the flow of slag slurry 14 enters the expansion turbine 80, for example. In other embodiments, the controller 18 may activate the turbine motor 82 as the flow of slag slurry 14 begins to accumulate in the expansion turbine 80 or if the rotation of the blades 88 stops for any reason. As the slag slurry 14 flows through the turbine 80, the flow of the slag slurry 14 maintains the rotation of the blades 88. Thus, in certain embodiments, the motor turbine motor 82 is omitted and the blades 88 rotate as long as the slag slurry 14 flows through the turbine 80.

The load 84 shown in FIG. 1 may receive the power generated by the rotation of the turbine shaft 90. For example, the load 84 may be a friction brake that converts the kinetic energy of the rotating turbine shaft 90 into heat energy, via friction. In other embodiments, the load 84 may be any suitable device that may generate power via the rotational output (e.g., energy) of the liquid expansion system 16, such as electrical power generation, or use the rotational output to operate an external mechanical load (e.g., machinery). For example, the load 84 may include an electrical generator, a centrifugal pump, a compressor, another energy extraction device, and so forth. In further embodiments, the load may include a combination of the friction brake, electrical power generator, and/or mechanical load, enabling electrical power to be generated when desired.

A second pressure sensor "P2" 86 may provide information on the second pressure of the slag slurry 14 exiting the liquid expansion system 16. In addition to generating power via the load 84, the liquid expansion system 16 may also cause a significant pressure drop of the slag slurry 14, as measured between the first pressure sensor "P1" 62 and the second sensor "P2" 86. For example, the first gage pressure of the slag slurry 14, as measured by the first pressure sensor "P1" 62, may be between approximately 1000 to 10,000 kPa, 2000 to 9000 kPa, or 3000 to 8000 kPa. In other words, the first pressure sensor "P1" 62 may indicate the high operating pressure of the gasifier 12. In contrast, the second gage pressure of the slag slurry 14, as indicated by the second pressure sensor "P2" 86 may be between atmospheric pressure (0 kPa) to 100 kPa, 20 to 80 kPa, or 40 to 60 kPa. In certain embodiments, the second pressure is approximately equal to atmospheric pressure. After exiting the liquid expansion system 16, the slag slurry 14 may travel for further downstream slag processing 92, such as dewatering of the slag slurry 14, before it is disposed of.

Figure 2:
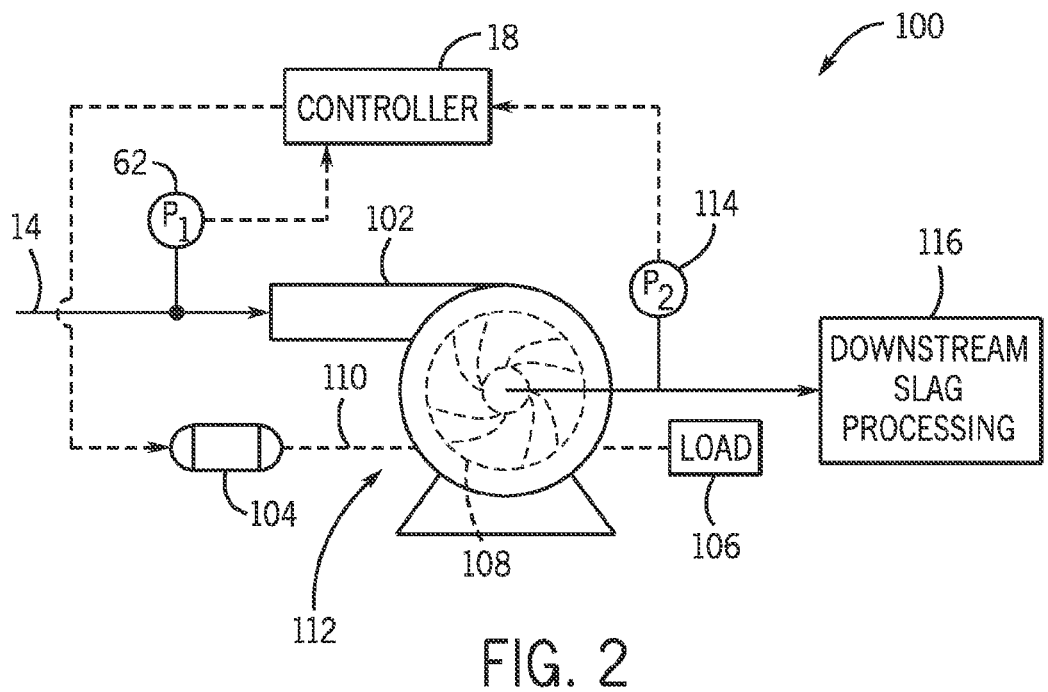
FIG. 2 is a schematic diagram of an embodiment of a continuous slag removal system having a centrifugal pump system.

FIG. 2 is a schematic diagram of an embodiment of a portion of a continuous slag removal system 10, having a centrifugal pump system 100. The centrifugal pump system 100 may effectively replace or supplement the liquid expansion system 16 of the continuous slag removal system 10 depicted in FIG. 1. The centrifugal pump system 100 may further include a centrifugal pump 102, a pump motor 104, and a load 106. The pump motor 104 is optional and may be used during startup or shutdown of the pump 102. For example, the initial flow of the slag slurry 14 through the pump 102 during startup may be insufficient to cause rotation of the pump 102. Thus, the motor 104 may be used to initiate rotation of the pump 102 and the motor 104 may be turned off thereafter. In other words, the motor 104 is not normally driving the pump 102, but instead the pump 102 is used to depressurize the slag slurry 14 and possibly to recover energy via the load 106. In certain embodiments, the pump motor 104 may be omitted.

In certain embodiments, the slag slurry 14 may be fed through the centrifugal pump 102, such that the pump 102 operates in reverse flow mode, enabling the centrifugal pump 102 to behave as a power recovery unit, such as the expansion turbine 80. In other words, the centrifugal pump 102 may act as an expansion turbine. Reverse flow mode may be defined as operating the centrifugal pump 102 such that the inlet flow enters what is normally the outlet of the pump, the outlet flow exits from what is normally the inlet of the pump, and the pump internals (e.g., an impeller and shaft) turn in a direction opposite from what is normal. When operating in reverse flow mode, the centrifugal pump 102 may generate or dissipate power instead of consuming it. In other words, an optional motor connected to the centrifugal pump 102 operating in reverse flow mode may act as an electrical generator. In certain embodiments, the centrifugal pump 102 may receive the flow of slag slurry 14 as it exits the gasifier 12 at an first pressure. The first gage pressure of the slag slurry 14, as measured by the first pressure sensor "P1" 62, may be between approximately 1000 to 10,000 kPa, 2000 to 9000 kPa, or 3000 to 8000 kPa. In other words, the first pressure sensor "P1" 62 may indicate the high operating pressure of the gasifier 12. In other embodiments, the centrifugal pump 102 may receive the flow of slag slurry 14 as it exits one or more slag crushers 64, or the heat exchanger 72. The centrifugal pump may further include a rotating impeller 108 that may cause the rotation of a pump shaft 110 in response to a flow of the slag slurry 14 through the centrifugal pump 102. Because the centrifugal pump 102 is configured to operate in reverse flow mode, the internal components of the centrifugal pump 102 may also be configured to operate similarly. For example, the bearings 112 and/or impeller 108 located within the centrifugal pump 102 may be configured or modified to be compatible with reverse flow mode.

The centrifugal pump 102 may be coupled to several other components of the centrifugal pump system 100, such as the pump motor 104 and the load 106. The pump motor 104, operated by the controller 18, may be used to initiate the rotation of the centrifugal pump 102 before the flow of slag slurry 14 enters the centrifugal pump 102. In other embodiments, the controller 18 may initiate the pump motor 104 as the flow of slag slurry 14 begins to accumulate within the centrifugal pump 102, or if the rotation of the impeller 108 stops for any reason. The load 106 may receive the power generated by the rotation of the pump shaft 110. For example, the load 106 may be a friction brake that converts the kinetic energy of the centrifugal pump 102 into heat energy, via friction. In other embodiments, the load 106 may be any suitable device that may generate power via the rotational output of the centrifugal pump system 100, such as electrical power generation or an external mechanical load. For example, the load 106 may include an electrical generator, a turbine, and so forth.

After exiting the centrifugal pump system 100, a second pressure sensor "P2" 114 may provide information on the second pressure of the slag slurry 14 to the controller 18. In addition to generating the load 106, the centrifugal pump system 100 may also cause a significant pressure drop of the slag slurry 14 as measured between the first pressure sensor "P1" 62 and the second sensor "P2" 114. The second gage pressure of the slag slurry 14, as indicated by the second pressure sensor "P2" 86, may be between atmospheric pressure (0 kPa) to 100 kPa, 20 to 80 kPa, or 40 to 60 kPa. In certain embodiments, the second pressure is approximately equal to atmospheric pressure. After exiting the centrifugal pump system 100, the slag slurry 14 with the atmospheric pressure may travel for further downstream slag processing 116, such as dewatering of the slag slurry 14, before it is disposed of.

Figure 3:
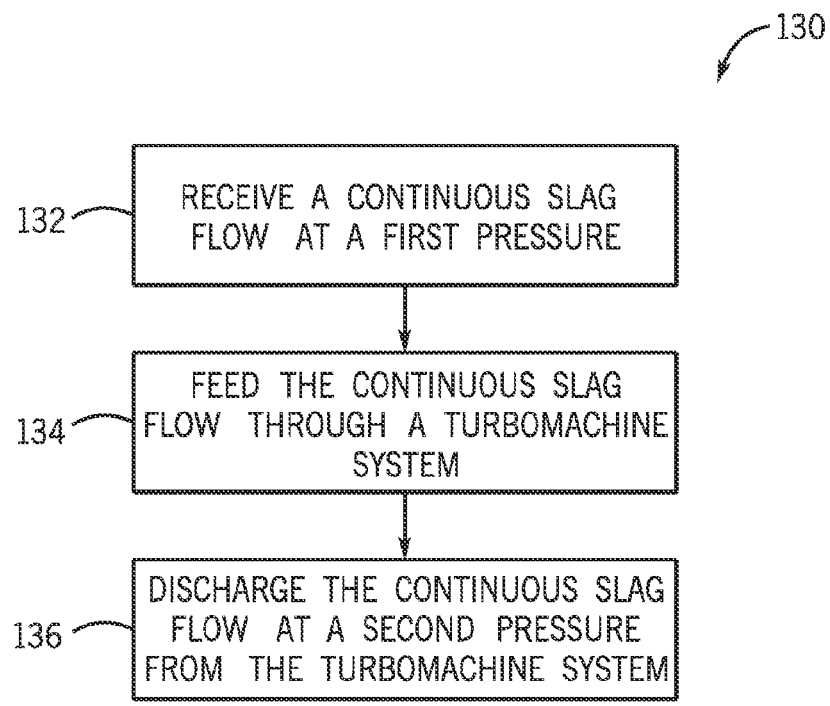
FIG. 3 is a flowchart illustrating a process for generating a pressure drop of a slag slurry in accordance with an embodiment.

FIG. 3 is a flowchart illustrating an embodiment of a process 130 for generating a pressure drop of the slag slurry 14. In certain embodiments, the process 130 begins with the liquid expansion system 16 (e.g., expansion turbine 80 and/or centrifugal pump 102) receiving a continuous flow of the slag slurry 14 as it exits a partial oxidation system, such as the gasifier 12 (block 132). The pressure of the slag slurry 14 as it exits the gasifier may indicate the high operating gage pressure of the gasifier 12, and may be between approximately 1000 to 10,000 kPa, 2000 to 9000 kPa, or 3000 to 8000 kPa. In other embodiments, the process 130 may begin with the liquid expansion system 16 receiving the continuous flow of slag slurry 14 as it exits the gasifier 12. In yet other embodiments, the slag slurry 14 may flow through one or more slag crushers 64 and one or more heat exchangers 72 before it enters either the liquid expansion system 16 or the centrifugal pump system 100.

The process 130 continues as the flow of slag slurry 14 is fed through the centrifugal pump 102, as the centrifugal pump 102 operates in reverse flow mode (block 134). The centrifugal pump 102 may be coupled to other components of the centrifugal pump system 100, such as the pump motor 104, pump shaft 110, or the load 106. A controller 18 may be used to initiate the pump motor 104, causing rotation of the centrifugal pump 102 before, or soon after, the flow of slag slurry 14 enters the centrifugal pump 102. In response to the flow of slag slurry 14 through the centrifugal pump 102, the pump shaft 110 may rotate and generate power via the load 106. The load 106 may be any suitable device that may generate power via the rotational output of the centrifugal pump system 100, such as electrical power generation or an external mechanical load. For example, the load 106 may include an electrical generator, a turbine, and so forth. In certain embodiments, the flow of slag slurry 14 is fed through the liquid expansion system 16, and the load 84 may be a device for generating electrical or mechanical power, such as an electrical generator, a centrifugal pump, and so forth.

The process 130 continues as the centrifugal pump system 100 discharges the continuous slag slurry 14 at a second pressure (block 136). The second pressure of the slag slurry 14 may be measured at a pressure sensor "P2" 114, and signaled to the controller 18, after the slag slurry 14 exits the centrifugal pump system 100. In certain embodiments, the second pressure of the slag slurry 14 may be measured at a pressure sensor "P2" 86 after the slag slurry 14 exits the liquid expansion system 16. In addition to generating power via the load 84 or 106, the liquid expansion system 16 or the centrifugal pump system 100 may also cause a significant pressure drop of the slag slurry 14 as measured between the first pressure sensor "P1" 62 and the second sensor "P2" 86/114. The second pressure of the slag slurry 14 may be near or around the atmospheric pressure, and the pressure difference between the first and second pressures may be between approximately 1000 to 10,000 kPa, 2000 to 9000 kPa, or 3000 to 8000 kPa. After exiting the liquid expansion system 16 or the centrifugal system 100, the slag slurry 14 may travel to downstream slag processing 92 or 116, such as dewatering of the slag slurry 14, before it is disposed of.

Technical effects of the invention include enabling a continuous slag removal system, while reducing the initial pressure of a slag slurry as it exits a gasifier to a final atmospheric pressure. The pressure drop may be achieved with the aid of machinery, such a centrifugal pump operating in reverse flow mode or an expansion turbine. The use of machinery to reduce the pressure of slag slurries may reduce operating expenses because the energy output of the machinery may result in electric or mechanical power generation. Furthermore, a continuous slag removal system may decrease the amount of space and time used to process waste slag exiting a gasifier. In particular, a continuous slag removal system employing machinery, such as a centrifugal pump or an expansion turbine, reduces the amount of additional quench liquid involved in slag slurry processing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a slurry source configured to output a slurry having a suspension of solids in a liquid; and
a slurry depressurizing system comprising a turbomachine configured to continuously receive the slurry from the slurry source at a first pressure and continuously discharge the slurry at a second pressure, and the turbomachine is configured to reduce the pressure of the slurry from the first pressure to the second pressure while recovering energy from the slurry.

2. The system of claim 1, wherein the turbomachine comprises an expansion turbine.

3. The system of claim 1, wherein the turbomachine comprises a centrifugal pump configured to operate in a reverse flow mode.

4. The system of claim 1, wherein the turbomachine comprises a rotating element configured to rotate in response to a flow of the slurry through the turbomachine, and a load coupled to the rotating element is configured to receive a rotational output in response to rotation of the rotating element.

5. The system of claim 4, wherein the load comprises a friction brake configured to convert the rotational output into heat energy, a generator configured to convert the rotational output into electrical power, or machinery configured to operate using the rotational output, or a combination thereof.

6. The system of claim 1, comprising a cooler disposed upstream of the turbomachine, wherein the cooler is configured to cool the slurry prior to flowing the slurry to the turbomachine.

7. The system of claim 1, comprising a driver coupled to the turbomachine, wherein the driver is configured to provide power to the turbomachine during startup, shutdown, a low flow condition, or any combination thereof.

8. The system of claim 1, wherein the turbomachine is driven in response to a flow of the slurry through the turbomachine, and the turbomachine comprises an electrical generator.

9. The system of claim 1, wherein the slurry source comprises a gasifier having a reaction chamber, wherein the slurry depressurizing system is disposed along a flow path downstream from the gasifier.

10. The system of claim 1, wherein the slurry depressurizing system is a slag slurry depressurizing system, the turbomachine is a slag slurry expansion turbomachine, and the slurry is a slag slurry comprising slag solids in the liquid.

11. The system of claim 10, comprising a slag crusher disposed along a flow path upstream of the slag slurry expansion turbomachine, wherein the slag crusher is configured to crush the slag solids to generate crushed slag solids, and a first average particle size of the crushed slag solids is less than a second average particle size of the slag solids.

12. The system of claim 1, comprising a controller configured to control continuous flow of the slurry downstream from the slurry source and continuous depressurization of the slurry via the turbomachine.

13. A system, comprising:
- a slurry source comprising a gasifier configured to gasify a feedstock to generate a syngas and gasification solids that mix with a liquid to form a slurry; and
- a turbomachine disposed along a flow path downstream from the slurry source, wherein the turbomachine is configured to continuously receive the slurry downstream from the slurry source at a first pressure, the turbomachine is configured to continuously discharge the slurry at a second pressure, and the first pressure is greater than the second pressure.

14. The system of claim 13, comprising a crusher disposed along the flow path between the slurry source and the turbomachine, wherein the crusher is configured to crush the gasification solids to generate crushed gasification solids, wherein a first average particle size of the crushed gasification solids is less than a second average particle size of the gasification solids.

15. The system of claim 14, wherein the first particle size is less than approximately 6 mm.

16. The system of claim 13, wherein a pressure difference between the first pressure and the second pressure is greater than approximately 1000 kPa.

17. The system of claim 13, comprising a flow control valve configured to adjust a flow rate of the slurry flowing to the turbomachine.

18. The system of claim 13, wherein the turbomachine is configured to generate electrical power, mechanical power, or heat via a friction brake in response to a flow of the slurry through the turbomachine.

19. The system of claim 13, wherein the turbomachine comprises a centrifugal pump configured to operate in a reverse flow mode, and the centrifugal pump comprises bearings configured to operate in the reverse flow mode.

20. The system of claim 13, comprising a controller configured to control continuous removal of the gasification solids from the slurry source and continuous depressurization of the slurry via the turbomachine.

21. The system of claim 20, comprising a plurality of sensors configured to provide feedback to the controller, wherein the feedback comprises temperature data, pressure data, flow data, or viscosity data, or a combination thereof.

22. A method, comprising:
- receiving a continuous flow of a slurry from a slurry source at a first pressure into a turbomachine along a flow path downstream from the slurry source, wherein the slurry comprises a suspension of solids in a liquid;
- feeding the continuous flow of the slurry from the slurry source through the turbomachine; and
- discharging the continuous flow of the slurry from the turbomachine at a second pressure, wherein the first pressure is greater than the second pressure.

23. The method of claim 22, comprising generating electric power or mechanical power in response to the continuous flow of the slurry through the turbomachine.

24. The method of claim 22, wherein the slurry source comprises a gasifier having a reaction chamber.

* * * * *